United States Patent
Ling et al.

(10) Patent No.: US 9,742,488 B2
(45) Date of Patent: Aug. 22, 2017

(54) MODULAR, EXPANDABLE SYSTEM FOR DATA RECEPTION AND DISTRIBUTION

(71) Applicant: MaxLinear, Inc., Carlsbad, CA (US)

(72) Inventors: Curtis Ling, Carlsbad, CA (US); Timothy Gallagher, Encinitas, CA (US); Glenn Chang, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 118 days.

(21) Appl. No.: 14/792,943

(22) Filed: Jul. 7, 2015

(65) Prior Publication Data

US 2015/0365160 A1   Dec. 17, 2015

Related U.S. Application Data

(63) Continuation of application No. 13/758,366, filed on Feb. 4, 2013, now Pat. No. 9,078,100.

(Continued)

(51) Int. Cl.
*H04B 7/185* (2006.01)
*H04W 84/10* (2009.01)
(Continued)

(52) U.S. Cl.
CPC .......... *H04B 7/18526* (2013.01); *G01S 19/42* (2013.01); *H04B 7/185* (2013.01); *H04B 7/18515* (2013.01); *H04B 7/18517* (2013.01); *H04B 7/18523* (2013.01); *H04H 20/08* (2013.01); *H04H 40/90* (2013.01); *H04J 4/00* (2013.01); *H04L 45/74* (2013.01); *H04L 61/2007* (2013.01); *H04L 65/4076* (2013.01); *H04N 21/4126* (2013.01); *H04N 21/4343* (2013.01); *H04N 21/4382* (2013.01); *H04N 21/43637* (2013.01); *H04N 21/441* (2013.01); *H04N 21/4405* (2013.01); *H04N 21/4408* (2013.01); *H04N 21/4524* (2013.01);
(Continued)

(58) Field of Classification Search
CPC ............................ H04B 7/18526; H04H 40/90
USPC ........ 455/3.01, 3.02, 3.06, 452.1, 3.03, 503, 455/509, 67.11, 414.1; 370/343
See application file for complete search history.

(56) References Cited

U.S. PATENT DOCUMENTS

| | | | |
|---|---|---|---|
| 5,594,454 A | * | 1/1997 | Devereux ............... G01S 19/09 342/352 |
| 6,356,569 B1 | | 3/2002 | Sonalkar et al. |

(Continued)

OTHER PUBLICATIONS

Int'l Search Report and Written Opinion for PCT/US2013/024878 dated Apr. 15, 2013.

(Continued)

*Primary Examiner* — John J Lee
(74) *Attorney, Agent, or Firm* — McAndrews, Held & Malloy, Ltd.

(57) ABSTRACT

A satellite reception assembly may comprise a first module operable to demodulate a first one or more channels of a signal output by a direct broadcast satellite (DBS) low noise block downconverter (LNB). The first module may output a signal to a second module which may demodulate a second one or more channels of the signal output by the DBS LNB. The second module may be installed after the satellite reception assembly has been deployed upon a number of clients served by the satellite reception assembly reaching a threshold.

20 Claims, 8 Drawing Sheets

Related U.S. Application Data (60) Provisional application No. 61/595,654, filed on Feb. 6, 2012.

(51) Int. Cl.

| | | |
|---|---|---|
| *H04H 40/90* | (2008.01) | |
| *H04N 21/45* | (2011.01) | |
| *H04N 21/61* | (2011.01) | |
| *H04H 20/08* | (2008.01) | |
| *H04N 21/643* | (2011.01) | |
| *H04W 4/02* | (2009.01) | |
| *H04N 21/41* | (2011.01) | |
| *H04N 21/4363* | (2011.01) | |
| *H04N 21/4405* | (2011.01) | |
| *H04N 21/434* | (2011.01) | |
| *H04N 21/438* | (2011.01) | |
| *H04N 21/4408* | (2011.01) | |
| *H04N 21/441* | (2011.01) | |
| *H04N 21/4627* | (2011.01) | |
| *H04J 4/00* | (2006.01) | |
| *H04W 76/04* | (2009.01) | |
| *H04L 12/741* | (2013.01) | |
| *H04L 29/12* | (2006.01) | |
| *H04W 84/04* | (2009.01) | |
| *H04W 88/08* | (2009.01) | |
| *H04W 88/16* | (2009.01) | |
| *G01S 19/42* | (2010.01) | |
| *H04L 29/06* | (2006.01) | |
| *H04H 60/21* | (2008.01) | |
| *H04H 60/23* | (2008.01) | |
| *H04W 84/12* | (2009.01) | |

(52) U.S. Cl.
CPC ......... *H04N 21/4627* (2013.01); *H04N 21/61* (2013.01); *H04N 21/6143* (2013.01); *H04N 21/6193* (2013.01); *H04N 21/64322* (2013.01); *H04W 4/023* (2013.01); *H04W 76/04* (2013.01); *H04W 84/042* (2013.01); *H04W 84/10* (2013.01); *H04W 88/08* (2013.01); *H04W 88/16* (2013.01); *H04H 60/21* (2013.01); *H04H 60/23* (2013.01); *H04W 84/12* (2013.01)

(56) References Cited

U.S. PATENT DOCUMENTS

| | | | |
|---|---|---|---|
| 7,899,087 B2 | 3/2011 | McNeely | |
| 8,466,850 B1 * | 6/2013 | Ling | H01Q 21/28 343/727 |
| 2002/0154055 A1 | 10/2002 | Davis et al. | |
| 2004/0077327 A1 * | 4/2004 | Lim | H03B 5/366 455/318 |
| 2007/0220584 A1 | 9/2007 | Lee et al. | |
| 2007/0294731 A1 | 12/2007 | Arsenault et al. | |
| 2009/0278992 A1 | 11/2009 | Gutknecht et al. | |
| 2009/0290659 A1 * | 11/2009 | Petrovic | H04H 20/30 375/340 |
| 2011/0158149 A1 | 6/2011 | Mugulavalli et al. | |

OTHER PUBLICATIONS

Cisco StadiumVision Headend Design and Implementation Guide [Online]. Cisco Systems Inc. Oct. 2010. [Retrieved on Jan. 4, 2013]. Retrieved from the internt <URL:http://www.cisco.com/en/US/docs/Sports_EntertainmentIDesign_Implementation_Guides/StadiumVision_Headend_DIG_for_Release _22-final.pdf> entire document.

* cited by examiner

MODULAR, EXPANDABLE SYSTEM FOR DATA RECEPTION AND DISTRIBUTION

CLAIM OF PRIORITY

This patent application is a continuation of U.S. patent application Ser. No. 13/758,366 (now U.S. Pat. No. 9,078,100) which in turn makes reference to, claims priority to and claims benefit from U.S. Provisional Patent Application Ser. No. 61/595,654 entitled "Method and System for an Internet Protocol LNB (IP LNB)" and filed on Feb. 6, 2012.

Each of the above-referenced documents are hereby incorporated herein by reference in its entirety.

INCORPORATION BY REFERENCE

This patent application also makes reference to:
U.S. Pat. No. 9,055,329 entitled "System and Method in a Broadband Receiver for Efficiently Receiving and Processing Signals" filed on Dec. 14, 2011;
and
United States Patent Application Publication Serial No. 2012/0163518 entitled "Method and Apparatus for Broadband Data Conversion" filed on Dec. 23, 2011; and
U.S. Pat. No. 8,611,483 entitled "Multi-Layer Time-Interleaved Analog-To-Digital Convertor (ADC)" filed on May 31, 2012.

Each of the above-referenced documents is hereby incorporated herein by reference in its entirety.

FIELD OF THE INVENTION

Certain implementations of this disclosure relate to data reception and distribution. More specifically, certain implementations of this disclosure relate to a modular, expandable system for data reception and distribution.

BACKGROUND OF THE INVENTION

Conventional methods and systems for data reception and distribution are too expensive, inefficient, and/or inflexible. Further limitations and disadvantages of conventional methods and systems will become apparent to one of skill in the art, through comparison of such systems with some aspects of this disclosure.

BRIEF SUMMARY OF THE INVENTION

A system and/or method is provided for a modular, expandable system for data reception and distribution as illustrated by and/or described in connection with at least one of the figures, as set forth more completely in the claims.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "example" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
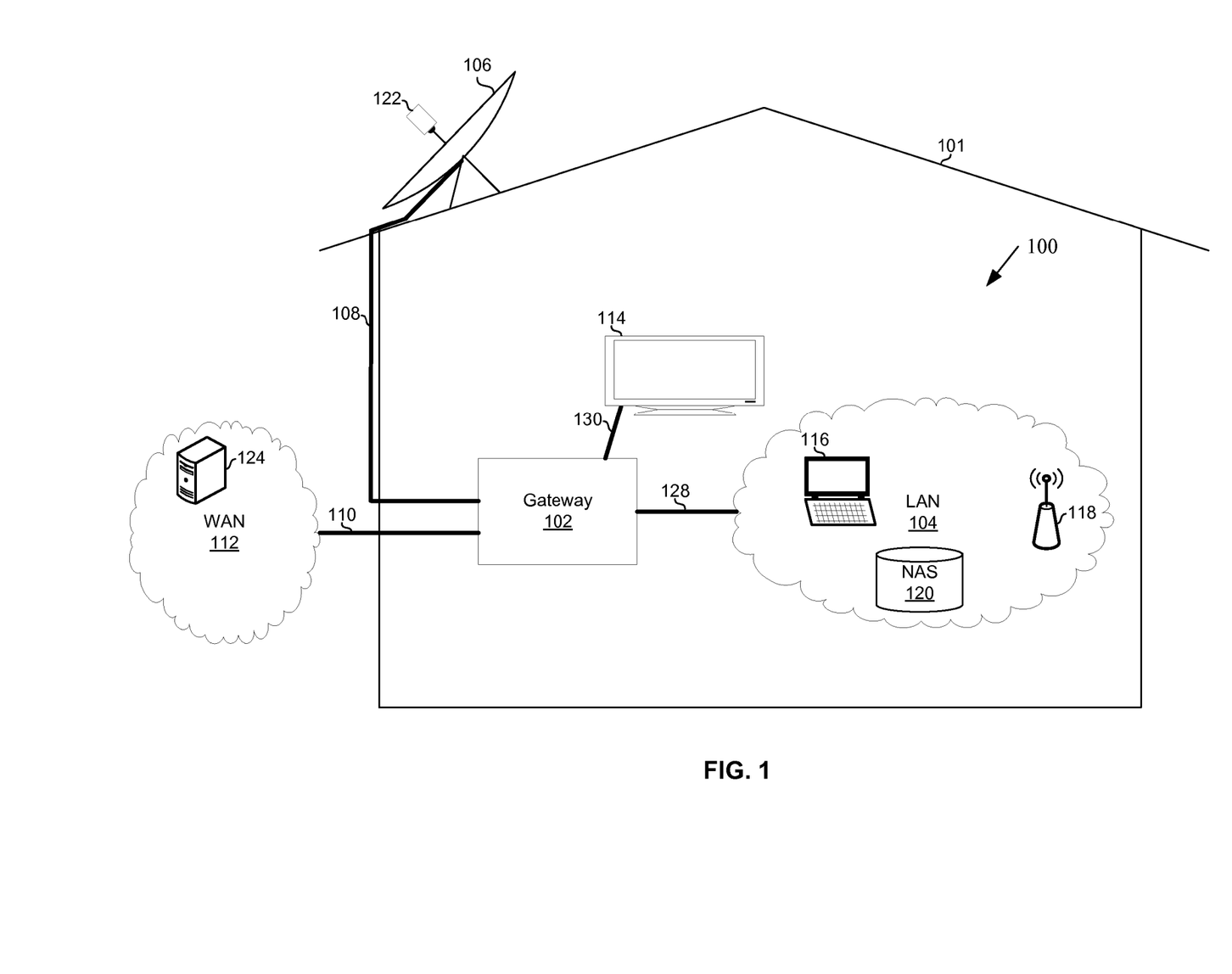
FIG. 1 depicts an example network comprising satellite television components, local area networking components, and wide area networking components.

FIG. 1 depicts an example network comprising satellite television components, local area networking components, and wide area networking components. As shown in FIG. 1, the system 100 comprises an example in-premises network 100, a satellite reception assembly 106 comprising a housing 122, a wide area network (WAN) 112 comprising one or more servers 124, a network link 108 connecting the dish 106 and the in-premises network 100, and a link 110 connecting the in-home network 100 and the WAN 112. The example in-home network 100 comprises a gateway 102, television 114, and a local area network (LAN) 104.

The satellite reception assembly 106 may comprise circuitry operable to receive satellite signals (e.g., K, Ka, and/or Ku band Direct Broadcast Satellite (DBS) signals), process the satellite signals to recover channels and/or information carried in the satellite signals (e.g., television channels, media content, etc.), and output the channels and/or information to the gateway 102 via the communication link 108. Example details of the satellite dish 106 reception assembly are described below with reference to FIGS. 2-5.

Each of the communication links 108 and 110 may comprise one or more wired, wireless, and/or optical links. The communication link 108 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards. The communication link 110 may comprise, for example, a coaxial or twisted-pair cable and/or an optical fiber which carries physical layer symbols in accordance with, for example, DSL, DOCSIS, or Ethernet standards.

The WAN 112 may comprise, for example, a DSL (or Cable Television/DOCSIS, or Fiber to the Home, or the like) headend and associated circuitry and/or devices. Such devices may include one or more servers 124 which are operable to communicate with the gateway 102.

The LAN 104 may comprise any number and/or type of client devices that communicate with the gateway 102 via link 128 using a networking protocol (e.g., Ethernet or MoCA). Examples of such devices shown include a computer 116, network attached storage 120, and a wireless access point (WAP) 118.

The client device 114 may comprise a device that communicates with the gateway 102 via one or more point-to-point media links (e.g., HDMI, Display Port, analog video links, analog video links, or the like). An example of such a device is a television.

The gateway 102 may comprise circuitry operable to receive the signals communicated over the links 108 and 110, process the signals as necessary for outputting information contained therein via one or more links 130 (e.g., an HDMI or Display Port link) and/or one or more links 128 (e.g., a MocA or Ethernet link). The gateway 102 may also comprise circuitry operable to transmit signals via the link 108 and/or via the link 110. Thus, unless otherwise indicated, the term "gateway" in this disclosure refers to a client device that performs satellite set-top box functions and WAN modem functions, where "satellite set-top box" functions are for delivering data from the satellite reception assembly 106 to devices within the premises and "WAN modem" functionality refers to communicating data between the premises 101 and the wide area network 112.

Figure 2A:
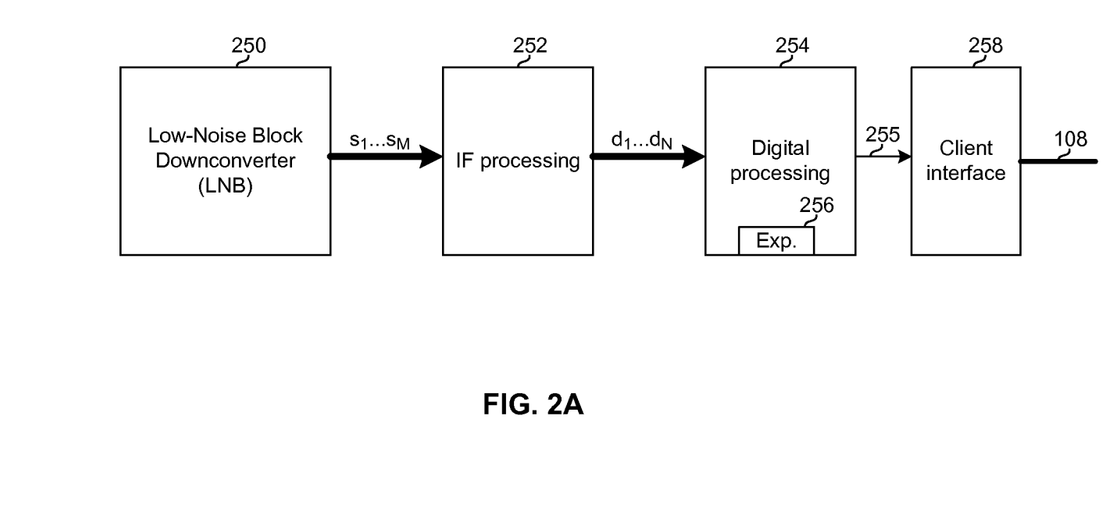
FIG. 2A depicts example circuitry of a satellite reception assembly.

FIG. 2A depicts example circuitry of a satellite reception assembly. The circuitry comprises a low-noise block-downconverter (LNB) 250, an IF processing circuit 252, a digital processing circuit 254, and a client interface circuit 258.

The LNB 250 may comprise circuitry operable to receive RF satellite signals (e.g., K, Ka, and/or Ku Band DBS signals) via a reflector of the satellite reception assembly, filter, downconvert, and/or amplify such signals to generate corresponding IF signals (e.g., in the L-band). The LNB 250 is illustrated outputting M (an integer number) of IF signals, labeled $s_1$ to $s_M$. Each of the IF signals may, for example, comprise an IF signal in the L-band (950 MHz to 2150 MHz), and may correspond to a respective satellite signal (e.g., $s_1$ may correspond to a first polarization of a first satellite, $s_2$ may correspond to second polarization of the first satellite, $s_3$ may correspond to a first polarization of a second satellite, and so on).

The IF processing circuit 252 may be operable to amplify, downconvert, filter, and/or digitize at least a portion of the IF signals $s_1$-$s_M$ to generate digital signals $d_1$-$d_N$, where N is an integer. In an example implementation of this disclosure, the IF processing circuit 242 may support full-spectrum capture where an entire spectrum of each of one or more protocols of interest may be concurrently digitized. For example, the IF processing circuit 252 may comprise M analog-to-digital converters each of which can digitize the entire bandwidth of one of the signals DBS signals $s_1 \ldots s_M$ to generate a corresponding one of signals $d_1 \ldots d_M$. In such an example implementation, each of the analog-to-digital converters may be as described in U.S. patent application Ser. No. 13/485,003 and/or U.S. patent application Ser. No. 13/336,451, each of which is incorporated by reference above. In another example implementation, only a portion of one or more of the signals $s_1$ to $s_M$ may be digitized and which portions are digitized may depend on which channels in the signals $s_1$ to $s_M$ are selected by client devices (e.g., which television channels are being consumed by the client(s)). The IF processing circuit 252 may be configured via one or more control signals (not shown) from the digital processing circuit 254 and/or the client interface circuit 258 which may, in turn, be based on upstream communications from one or more clients.

The digital processing circuit 254 may be operable to process the signals $d_1$-$d_N$ to recover information carried in one or more channels contained in the signals $d_1$-$d_N$ and output that information to the client interface 258 (as signal 255) and/or via the expansion interface circuit 256. An example implementation of the digital processing circuit 254 is described below with reference to FIGS. 3A-3C.

The client interface circuit 258 may be operable to process data received as signal 255 and output that information onto link 108 in a format support by one or more client devices coupled to the link 108. For example, the client interface circuit 258 may be operable to packetize and transmit data received via signal 255 in accordance with one or more networking standards (e.g., Ethernet, Multimedia over Coax Alliance (MoCA), DOCSIS, and the like) to client devices that receive satellite data using such standards. Additionally, or alternatively, the client interface circuit 258 may be operable to perform operations (e.g., digital to analog conversion, modulation, frequency conversion, etc.) for outputting the data received via signal 255 according to one or more multimedia standards (e.g., ATSC, DVB-S, ISDB-S, and the like) to client devices that receives satellite data using such standards.

Figure 2B:
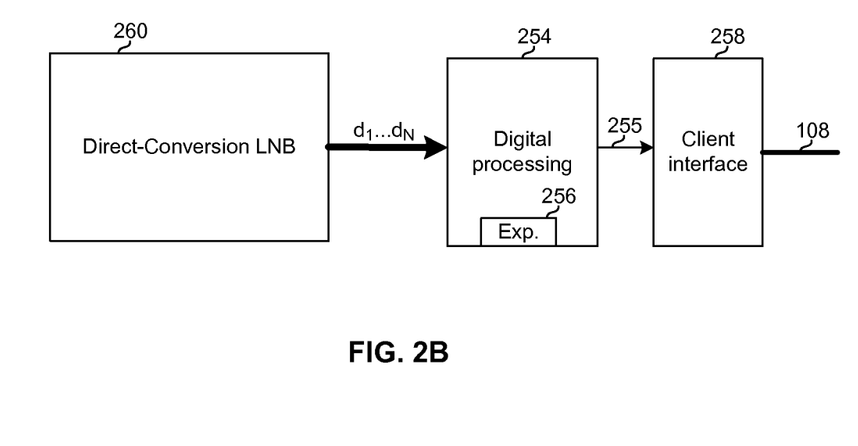
FIG. 2B depicts example circuitry of a satellite reception assembly comprising a direct conversion LNB.

FIG. 2B depicts example circuitry of a satellite reception assembly comprising a direct conversion LNB. IN FIG. 2B, a LNB 270 directly outputs the signals $d_1$-$d_N$. Accordingly, the need for the IF processing block is eliminated.

Figure 3A:
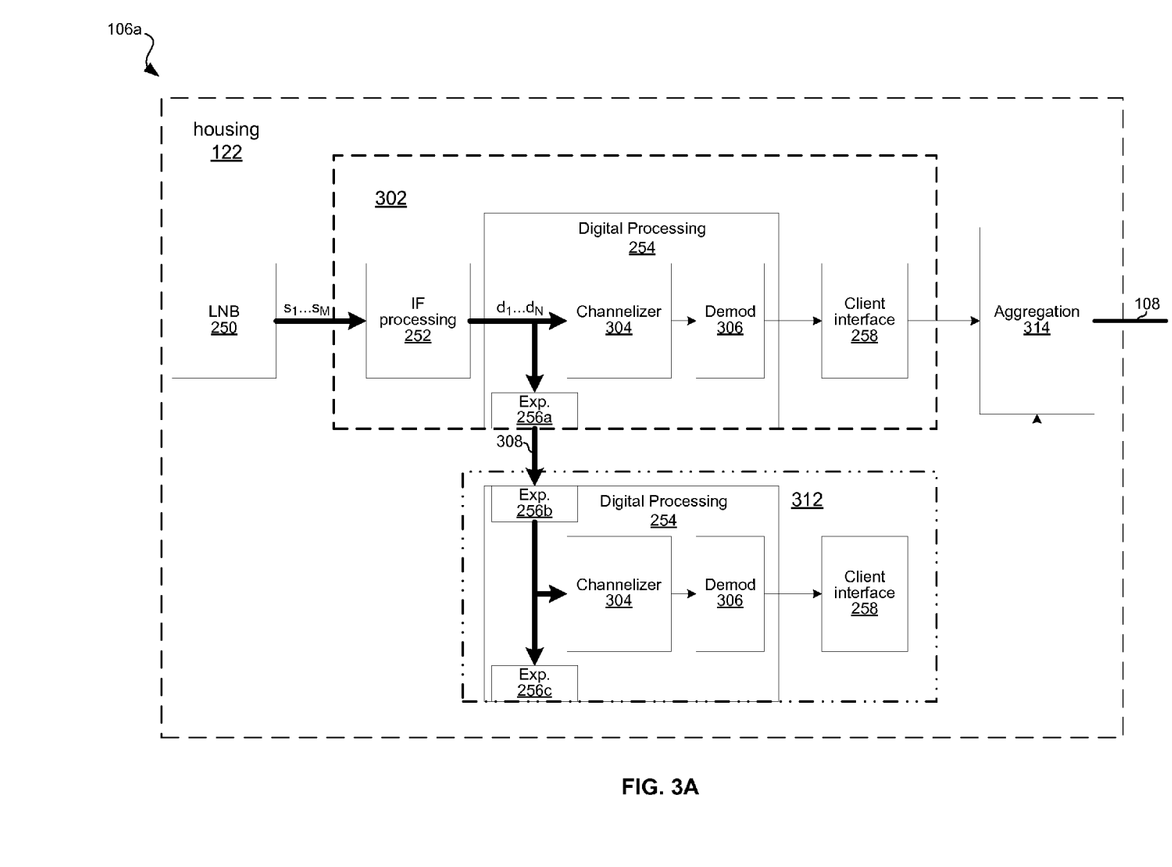
FIG. 3A depicts a first example implementation of a modular, expandable satellite reception assembly.

FIG. 3A depicts a first example implementation of a modular, expandable satellite reception assembly. The satellite reception assembly 106a comprises a housing 122 in which reside the LNB 250, a first module 302, a second module 312, and an aggregation circuit 314. The housing 122 may be, for example, part of a satellite reception assembly (e.g., a DBS satellite "dish") and may be mounted on a boom at or near the focal point of a parabolic reflector.

The two modules 302 and 312 may reside on separate substrates. For example, the module 302 may be on a first semiconductor die on a first semiconductor package and the module 312 may be on a second semiconductor die in a second semiconductor package. Additionally or alternatively, the module 302 may reside on a first printed circuit board and the module 312 may reside on a second printed circuit board. In an example implementation, the module 302 may be hard-wired (e.g., soldered) to a motherboard in the housing 302 whereas the module 312 may be mounted to the motherboard via a socket. In an example implementation, the satellite reception assembly 106a may have been deployed (e.g., mounted to the home or office of a DBS subscriber) without the module 312, and the module 312 may have been later installed while the assembly 122 was in the field.

The module 302 comprises an instance of the IF processing circuit 252, an instance of the client interface circuit 258, and an instance of the digital processing circuit 254. The module 312 comprises an instance of the client interface circuit 258 and an instance of the digital processing circuit 254.

The IF processing circuit 252 may be as described above with reference to FIG. 2, for example.

Each instance of the client interface circuit 258 in FIG. 3A may be as described above with reference to FIG. 2, for example. As an example, each instance of the client interface circuit 258 in FIG. 3A may output packets in accordance with a suitable networking standard. Accordingly, the aggregation circuit 314 may perform packet/frame routing/switching and/or act as a host/scheduler to manage delivery of the transport stream data from the two instances of the client interface circuit 258 onto the link 108.

Each instance of the digital processing circuit 254 may comprise one or more instances of expansion interface circuit 256 (labeled 256a, 256b, and so on), a channelizer circuit 304, and a demodulation circuit 306.

The expansion interface circuit 256 may be operable to communicate information across a signal bus 308 in accordance with one or more standards such as reduced gigabit media independent interface (RGMII), a communication standard or protocol operating at 60 GHz, Thunderbolt, or other suitable standard or protocol. In the example implementation depicted in FIG. 3A, one or more of the signals $d_1 \ldots d_N$ are output by module 302 via the expansion interface circuit 256a. In module 312, signals received via expansion interface circuit 256b are output via expansion interface circuit 256c. In this manner, multiple modules 312 may be installed in the housing 122 in a daisy-chain-connected fashion. In another implementation, additional and/or alternative signals (e.g., selected channels output by the channelizer 304) may be communicated between modules 302 and 312 via the expansion interface circuits 256.

The channelizer circuit 304 may be operable to process the digitized signals $d_1$-$d_N$ (e.g., decimate and filter such signals) such that it outputs the one or more channels of the digitized signals $d_1$-$d_M$ that have been selected for consumption by a client device. In this regard, the channelizer 304 may, for example, serve as a crossbar for selecting a set of desired channels from among a plurality of channels available from one or more broadband sources. In an example full-spectrum capture implementation, N may be equal to 4, with signals $d_1$ corresponding polarization one of satellite one, $d_2$ corresponding to polarization two of satellite one, $d_3$ corresponding to polarization one of satellite two, and $d_4$ corresponding to polarization two of satellite two. In such an example, the channelizer 304 may select any arbitrary N (an integer) channels from among all channels carried by the two satellites. The number of channels the channelizer 304 is operable to select may be limited by size, power, and/or cost constraints. In an example implementation, channelizer 304 of module 302 may be operable to select N channels and channelizer 304 of module 312 may be operable to select M channels where N and M are integers which may or may not be equal.

The demodulation circuit 306 may be operable to demodulate one or more of the selected channels output by the channelizer circuit 304 to recover one or more transport streams (e.g., MPEG transport streams) from the selected one or more channels. The demodulation circuit 306 may support any suitable modulation standards such as, for example, DVB-S and/or ISDB-S.

In another example implementation, the digital processing circuit 254 may comprise additional components such as, for example, a forward error correction circuit and/or packet id (PID) filter. By performing forward error correction and/or PID filtering in the satellite reception assembly 106a, the amount of bandwidth needed on the link 108 for transmitting a received channel, for example, may be reduced by elimination of redundant data, parity bits, etc.

In another example implementation, the module 302 may interface to the direct conversion LNB 270. In such an implementation, the IF processing module 252 may not be populated in the module 302 and/or may be populated but bypassed.

Figure 3B:
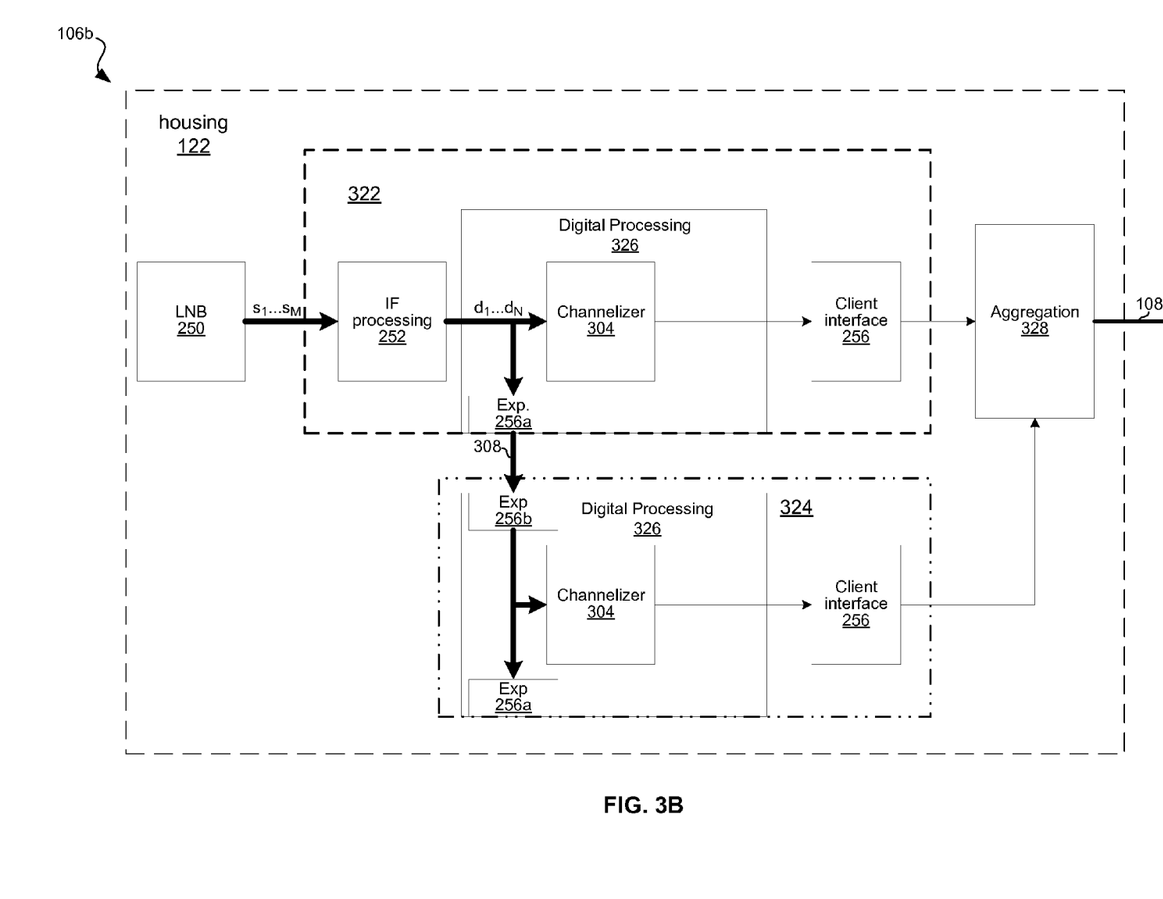
FIG. 3B depicts a second example implementation of a modular, expandable satellite reception assembly.

FIG. 3B depicts a second example implementation of a modular, expandable satellite reception assembly. The satellite reception assembly 106b comprises a housing 122 in which reside the LNB 250, a first module 322, a second module 324, and an aggregation circuit 356. The housing 122 may be, for example, part of a satellite reception assembly (e.g., a DBS satellite "dish") and may be mounted on a boom at or near the focal point of a parabolic reflector.

The two modules 322 and 324 may be similar to the modules 302 and 312 of FIG. 3A, but may comprise instances of digital processing circuit 326 that, unlike digital processing circuit 254, does not comprise a demodulator. Consequently, the modules 322 and 324 may output selected channels without demodulating them. Accordingly, the aggregation circuit 356 may perform time and/or frequency division multiplexing in order combine the channels output from the various instances of client interface 256 onto the link 108. In an implementation using frequency division multiplexing on the link 108, the frequencies at which the client interface circuits 256 in FIG. 3B output the selected channels may be different (e.g., hard-coded differently, configured differently during installation of the module 324, and/or configurable during run-time) such that the aggregation circuit 356 may not be unnecessary.

In another example implementation, the module 322 may interface to the direct conversion LNB 270. In such an implementation, the IF processing module 252 may not be populated in the module 302 and/or may be populated but bypassed.

Figure 3C:
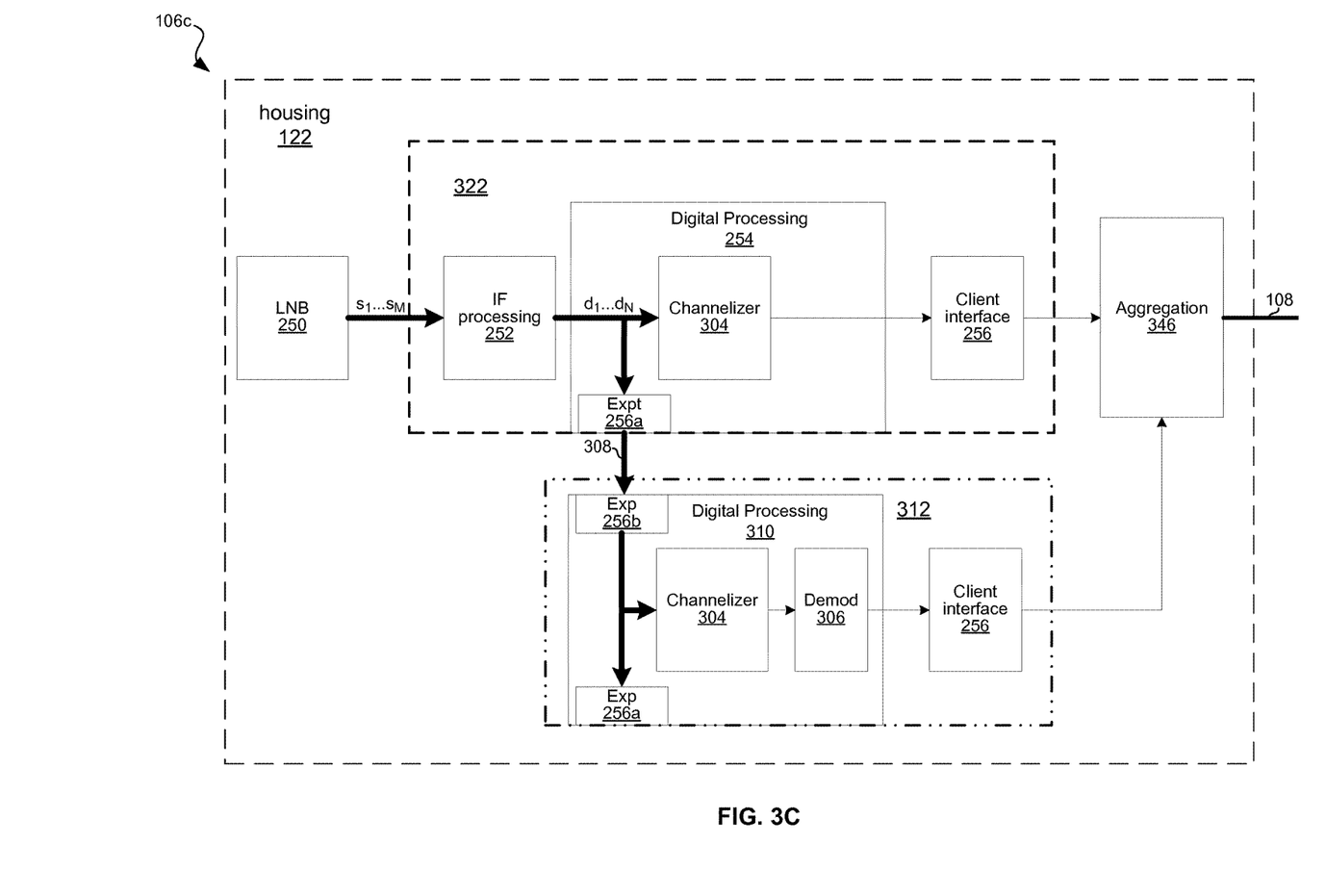
FIG. 3C depicts a third example implementation of a modular, expandable satellite reception assembly.

FIG. 3C depicts a third example implementation of a modular, expandable satellite reception assembly. The satellite reception assembly 106c comprises a housing 122 in which reside the LNB 250, an instance of the module 322, an instance of the module 324, and an aggregation circuit 356. The housing 122 may be, for example, part of a satellite reception assembly (e.g., a DBS satellite "dish") and may be mounted on a boom at or near the focal point of a parabolic reflector.

The module 322 may be as described with reference to FIG. 3B, and the module 312 may be as described with reference to FIG. 3A. As a result, the module 322 may output selected modulated channels while the module 312 may output packetized transport streams and the aggregation circuit 346 may be operable to combine the different types of outputs onto the link 108. For example, where the module 312 outputs Ethernet physical layer signals, the aggregation circuit may upconvert signals from the module 322 to frequencies above the band used for the Ethernet physical layer signals (e.g., 125 MHz). As another example, where the module 312 uses MoCA, the channels output by the module 322 may be output on the link 108 at frequencies below the MoCA band.

In another example implementation, the module 322 may interface to the direct conversion LNB 270. In such an implementation, the IF processing module 252 may not be populated in the module 302 and/or may be populated but bypassed.

Figure 4:
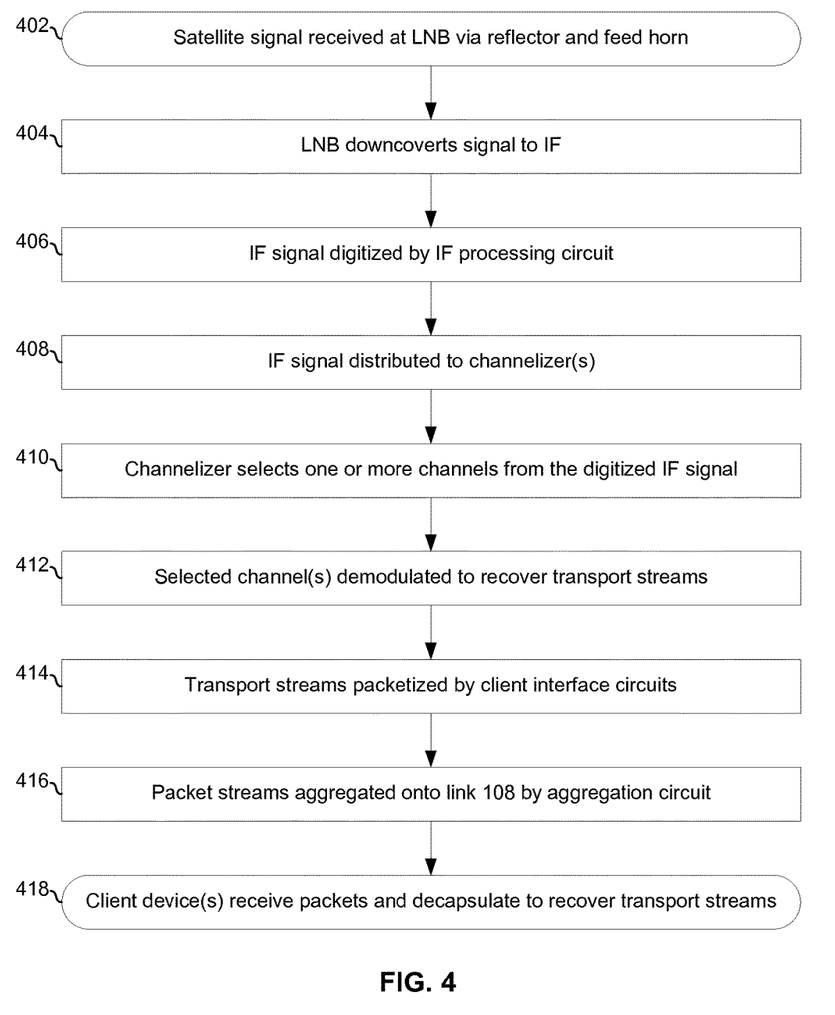
FIG. 4 depicts a flowchart of an example process for reception and distribution signals in a modular, expandable satellite reception assembly.

FIG. 4 depicts a flowchart of an example process for reception and distribution signals in a modular, expandable satellite reception assembly. The flowchart of FIG. 4 may correspond to the example implementation in FIG. 3A, for example. In block 402, a satellite signal (e.g., Ka or Ku band DBS signal) is received at the LNB 250 via a reflector and a feedhorn of the satellite reception assembly 106. In block 404, the LNB downconvertst the received signal to an IF signal (e.g., L-band signal). In block 406, the IF processing circuit 252 digitizes the IF signal from the LNB. In block 408, the digitized IF signal is conveyed to a plurality of instances of the channelizer 304, where one or more of the instances may be reached via an expansion interface circuit 256 and corresponding signal bus 308. In block 410, each instance of the channelizer 304 selects one or more channel from among the plurality of channels carried in the digitized IF signal. Which one or more channels are selected may be determined based on which channels/programs are being consumed by client devices served by the corresponding instance of channelizer 304. In block 412, the selected channels from each instance of the channelizer 304 are demodulated by a corresponding instance of demodulation circuit 306 to recover one or more transport streams. In block 414, the transport streams are packetized and transmitted by the instances of the client interface circuits 258. In block 416, the packet streams are aggregated onto the link 108 by the aggregation circuit 314. In block 418, the packet streams arrive at client devices which decapsulate the packets to recover the transport stream data.

Figure 5:
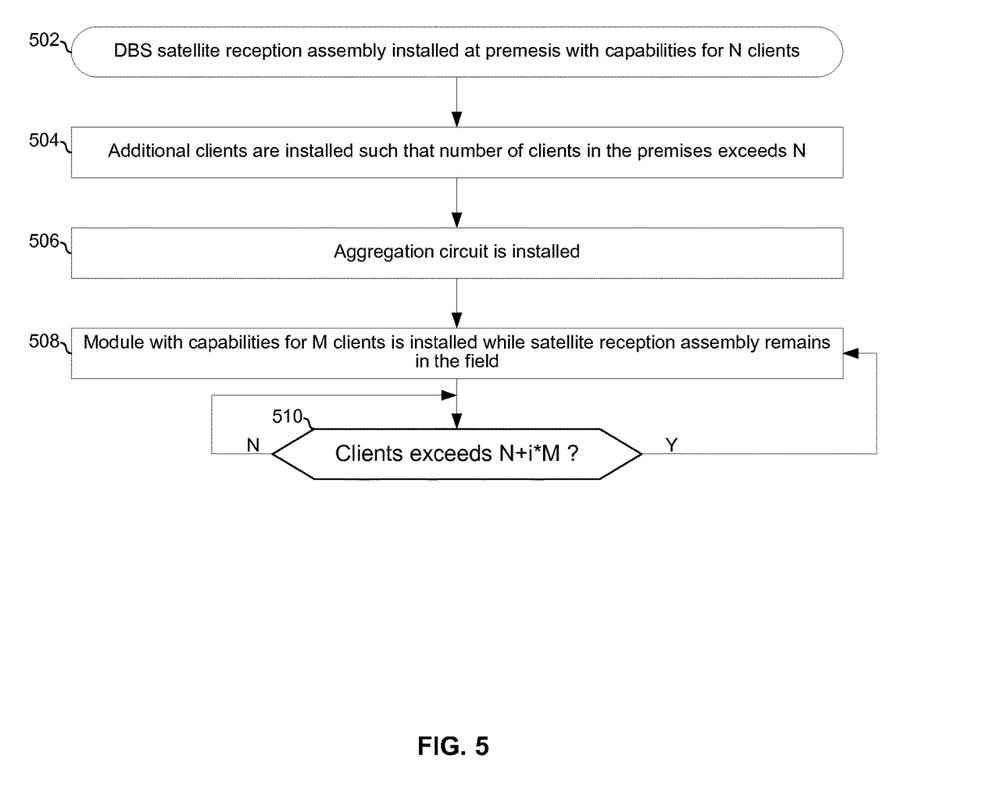
FIG. 5 depicts a flowchart for configuration of a modular, expandable satellite reception assembly.

FIG. 5 depicts a flowchart for configuration of a modular, expandable satellite reception assembly. In block 502, a DBS satellite reception assembly 106 is installed at a customer premises (e.g., a DBS subscriber's home or office). At the time of installation, the satellite reception assembly 106 supports up to N clients (e.g., it has circuitry for demodulating N channels). In block 504, additional client devices are installed at the premises such that the total number of clients to be served by the satellite reception assembly exceeds N. In block 506 an aggregation circuit is installed (if necessary). In block 508 a module (e.g., module 312 or 324) in installed in the satellite reception assembly 106 while the satellite reception assembly remained in the field (i.e., remains installed at the subscriber's premises). In one embodiment, the module may be hot-swappable. The satellite reception assembly 106 may then begin distributing satellite data to up to N+M clients. In step 510, when the number of clients being served by the satellite reception assembly 106 approaches or exceeds N+i*M, where i is the number of additional modules 312 or 324 installed, the process may return to block 508 and an additional module 312 or 324 may be installed.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   first circuitry comprising analog-to-digital conversion circuitry, channelization and client interface circuitry, and expansion interface circuitry, wherein:
   said analog-to-digital conversion circuitry is configured to digitize each of a plurality of downconverted satellite signals to generate a plurality of digitized satellite signals, each of said plurality of downconverted satellite signals comprising a plurality of channels;
   said channelization and client interface circuitry is configured to select one or more of said channels for output via a first interface of said first circuitry;
   said expansion interface circuitry is configured to output one or more of said digitized satellite signals via a second interface of said first circuitry.

2. The system of claim 1, comprising second circuitry configured to receive said one or more of said digitized satellite signals from said second interface of said first circuitry via a second interface of said second circuitry.

3. The system of claim 2, wherein said second circuitry comprises channelization and client interface circuitry configured to select one or more of said channels for output via a first interface of said second circuitry.

4. The system of claim 3, wherein said second circuitry comprises expansion interface circuitry configured to output one or more of said digitized satellite signals via a third interface of said second circuitry.

5. The system of claim 2, wherein said first circuitry resides on a first semiconductor die and said second circuitry resides on a second semiconductor die.

6. The system of claim 2, wherein said second circuitry resides in a socket on a printed circuit board such that said second circuitry is field replaceable.

7. The system of claim 2, wherein said first circuitry and said second circuitry reside in a shared housing along with a low noise block downconverter that outputs said downconverted satellite signals.

8. The method of claim 2, wherein said first circuitry and said second circuitry reside in a shared housing along with a low noise block downconverter that outputs said downconverted satellite signals.

9. The system of claim 1, wherein each of said downconverted satellite signals corresponds to a respective one of a plurality of polarizations of a respective one of a plurality of satellites.

10. The system of claim 1, comprising aggregation circuitry configured to receive said one or more of said channels output via said first interface of said first circuitry and said one or more of said channels output via said first interface of said second circuitry.

11. The system of claim 10, wherein said aggregation circuitry is configured to perform time division multiplexing and/or frequency division multiplexing of said one or more of said channels output via said first interface of said first circuitry and said one or more of said channels output via said first interface of said second circuitry onto a link to a client device.

12. The method of claim 10, comprising time division multiplexing and/or frequency division multiplexing, by said aggregation circuitry, said one or more of said channels output via said first interface of said first circuitry and said one or more of said channels output via said first interface of said second circuitry onto a link to a client device.

13. The method of claim 1, wherein each of said downconverted satellite signals corresponds to a respective one of a plurality of polarizations of a respective one of a plurality of satellites.

14. The method of claim 1, comprising receiving, in aggregation circuitry, said one or more channels output via said first interface of said first circuitry and said one or more of said channels output via said first interface of said second circuitry.

15. A method comprising:
in first circuitry:
digitizing, via analog-to-digital conversion circuitry, each of a plurality of downconverted satellite signals to generate a plurality of digitized satellite signals, each of said plurality of downconverted satellite signals comprising a plurality of channels;
selecting, by channelization and client interface circuitry, one or more of said channels for output via a first interface of said first circuitry;
outputting, via expansion interface circuitry, one or more of said digitized satellite signals via a second interface of said first circuitry.

16. The method of claim 15, comprising receiving, in second circuitry, said one or more of said digitized satellite signals from said second interface of said first circuitry via a second interface of said second circuitry.

17. The method of claim 16, wherein said first circuitry resides on a first semiconductor die and said second circuitry resides on a second semiconductor die.

18. The method of claim 16, wherein said second circuitry resides in a socket on a printed circuit board such that said second circuitry is field replaceable.

19. The method of claim 15, comprising selecting, by channelization and client interface circuitry of said second circuitry, one or more of said channels for output via a first interface of said second circuitry.

20. The method of claim 19, comprising outputting, by expansion interface circuitry of said second circuitry, one or more of said digitized satellite signals via a third interface of said second circuitry.

* * * * *